United States Patent
Andou

(10) Patent No.: US 9,157,409 B2
(45) Date of Patent: Oct. 13, 2015

(54) COMBUSTION CONTROL DEVICE AND CONTROL METHOD FOR INTERNAL COMBUSTION ENGINE

(71) Applicant: MITSUBISHI HEAVY INDUSTRIES, LTD., Tokyo (JP)

(72) Inventor: Junnosuke Andou, Tokyo (JP)

(73) Assignee: MITSUBISHI HEAVY INDUSTRIES, LTD, Tokyo (JP)

( * ) Notice: Subject to any disclaimer, the term of this patent is extended or adjusted under 35 U.S.C. 154(b) by 0 days.

(21) Appl. No.: 14/362,799

(22) PCT Filed: Jan. 17, 2013

(86) PCT No.: PCT/JP2013/050855
§ 371 (c)(1),
(2) Date: Jun. 4, 2014

(87) PCT Pub. No.: WO2013/108858
PCT Pub. Date: Jul. 25, 2013

(65) Prior Publication Data
US 2014/0331971 A1    Nov. 13, 2014

(30) Foreign Application Priority Data
Jan. 20, 2012    (JP) ................................ 2012-009542

(51) Int. Cl.
*F02M 7/00* (2006.01)
*F02P 5/04* (2006.01)
(Continued)

(52) U.S. Cl.
CPC .............. *F02P 5/045* (2013.01); *F02D 35/023* (2013.01); *F02D 41/0087* (2013.01);
(Continued)

(58) Field of Classification Search
CPC . F02D 35/023; F02D 41/3076; F02D 35/024; F02D 41/005; F02D 41/22; F01B 31/14
USPC ........................... 123/435, 202; 701/101, 102
See application file for complete search history.

(56) References Cited

U.S. PATENT DOCUMENTS 3,680,305 A * 8/1972 Miller ............................ 60/611
6,843,212 B2 * 1/2005 Shimizu et al. ............. 123/48 B
(Continued)

FOREIGN PATENT DOCUMENTS

JP          60-47836 A      3/1985
JP          61-145365 A     7/1986
(Continued)

OTHER PUBLICATIONS

Bitting et al., "Effects of Combustion Chamber Deposits on Tailpipe Emissions", SAE Technical Paper Series, International Congress & Exposition, Detroit, Michigan, Feb. 28-Mar. 3, 1994, pp. 1-6, 940345.

(Continued)

*Primary Examiner* — Lindsay Low
*Assistant Examiner* — Long T Tran
(74) *Attorney, Agent, or Firm* — Birch, Stewart, Kolasch & Birch, LLP

(57) ABSTRACT

In a control device 50A, an actual compression ratio calculation unit 502 calculates an actual compression ratio $\epsilon$ from an air supply pressure Ps, a cylinder pressure before ignition Pc and an air supply temperature Ts. A deposit deposition estimation unit 504 determines the deposit deposition state of a combustion chamber 18 from a deviation $\Delta\epsilon$ between the actual compression ratio $\epsilon$ and a design compression ratio $\epsilon'$. When the deviation $\Delta\epsilon$ exceeds a threshold value, ignition timing or air-fuel ratio being operation conditions of an internal combustion engine is corrected based on a correction map 508 so as to suppress deterioration of exhaust gas.

9 Claims, 9 Drawing Sheets

(51) Int. Cl.
  *F02P 5/15*  (2006.01)
  *F02D 35/02*  (2006.01)
  *F02D 41/00*  (2006.01)
  *F02D 41/22*  (2006.01)
  *F02D 41/30*  (2006.01)
  *F02D 19/02*  (2006.01)

(52) U.S. Cl.
  CPC .............. *F02D 41/22* (2013.01); *F02D 41/30* (2013.01); *F02P 5/1502* (2013.01); *F02D 19/023* (2013.01); *F02D 41/0027* (2013.01); *F02D 2200/0406* (2013.01); *F02D 2200/0414* (2013.01); *Y02T 10/46* (2013.01)

(56) References Cited

U.S. PATENT DOCUMENTS

| | | | |
|---|---|---|---|
| 7,533,650 B2 * | 5/2009 | Kim | 123/300 |
| 8,627,789 B2 * | 1/2014 | Hiraya et al. | 123/48 R |
| 2007/0021903 A1 * | 1/2007 | Christen et al. | 701/108 |
| 2011/0036075 A1 * | 2/2011 | Hagiwara | 60/285 |
| 2012/0160217 A1 * | 6/2012 | Ashizawa | 123/48 D |

FOREIGN PATENT DOCUMENTS

| | | |
|---|---|---|
| JP | 8-4562 A | 1/1996 |
| JP | 8-261033 A | 10/1996 |
| JP | 9-96238 A | 4/1997 |
| JP | 2004-92574 A | 3/2004 |
| JP | 2005-48621 A | 2/2005 |
| JP | 2005-69042 A | 3/2005 |
| JP | 2005-140054 A | 6/2005 |
| JP | 2006-220139 A | 8/2006 |
| JP | 2007-170405 A | 7/2007 |
| JP | 2010-71126 A | 4/2010 |
| JP | 2010-221751 A | 10/2010 |

OTHER PUBLICATIONS

International Preliminary Report on Patentability and Written Opinion of the International Searching Authority (Forms PCT/IB/326, PCT/IB/373, PCT/IB/338 and PCT/ISA/237) and English translation thereof, dated Jul. 31, 2014, for International Application No. PCT/JP2013/050855.

International Search Report, dated Dec. 12, 2013, for International Application No. PCT/JP2013/050855.

* cited by examiner

COMBUSTION CONTROL DEVICE AND CONTROL METHOD FOR INTERNAL COMBUSTION ENGINE

TECHNICAL FIELD

This invention relates to a combustion control device and a control method for an internal combustion engine, which are capable of determining the deposition state of the carbon deposit in the combustion chamber and switching to the operation that suppresses deterioration of the exhaust gas property based on the deposition state.

BACKGROUND ART

In an internal combustion engine, generally, deposit such as the carbon deposit being residue of fuel or lubricant oil is accumulated inside the combustion chamber with the prolonged operation. For instance, the deposit is accumulated on the piston surface, the fuel injection valve, and the like. As a result, the compression ratio increases, causing $NO_X$, CO, HC, etc in the exhaust gas to show an increasing trend. FIG. 12 is a diagram of a relation between deposition of the deposit inside the combustion chamber (travel distance) and $NO_X$ in the exhaust gas in an internal combustion engine provided for an automobile. As shown in FIG. 12, the amount of $NO_X$ increases with the deposit deposition, and $NO_X$ in the exhaust gas decreases by cleaning inside the cylinder and removing the deposit. The same trend can be observed for CO and HC in the exhaust gas.

Conventionally, a variety of methods have been employed for combustion control of the internal combustion engine and monitoring of the combustion state. For instance, as disclosed in Patent Documents 1 and 2, there are combustion control methods of monitoring the cylinder internal pressure of the internal combustion engine. These methods merely detect the combustion state based on the pressure waveform inside the cylinder and correct the fuel supply amount, the fuel supply timing, and the injection timing based on the detected result. Thus, the existence of the deposit is not detected. Therefore, even if some abnormality has occurred for a certain cylinder and the deposit is markedly increased, such abnormality cannot be detected promptly, which may lead to troubles such as damage to the internal combustion engine.

Further, in the case where tuning is performed upon installation for operation of the internal combustion engine, the exhaust gas property needs to be set with a margin in anticipation of the change due to aging, because the deposit deposition state can be detected only by opening the engine (or checking with a fiberscope while the engine is stopped). Accordingly, it is not always possible to provide an operation setting with high efficiency.

Further, conventionally, maintenance for removing the deposit is automatically set to be performed at a certain interval of the operation period. Thus, unnecessary maintenance is performed for an internal combustion engine with the operation conditions that produce a small amount of deposit even for the engine of the same type, causing extra maintenance cost. In contrast, for an engine with the operation conditions that produce a large amount of deposit (such as an engine often performing low-load operation), there is a possibility that the timing for removing the deposit is delayed and the exhaust gas exceeds the regulation value.

On the other hand, Patent Document 3 discloses a means to determine whether there is any deposit accumulated inside the cylinder. In the presence of deposit, the fuel is absorbed by the deposit. Thus, this determination means focuses on the increased number of injection by the injectors compared to the normal state being required before a rich signal is outputted by the oxygen level sensor provided for the air discharge pipe. That is, the injector of a certain cylinder is stopped for a certain period of time and then restarted, and then existence of deposit is determined based on the number of injection performed by the injector before a rich signal is outputted from the oxygen level sensor therein.

Further, patent Document 4 discloses a means for estimating the deposit deposition amount accumulated mainly on the fuel injection valve and the like. This estimation means estimates the deposit deposition amount from a correlation map between the deposit deposition amount and the operation state amount (such as net mean effective pressure and rotation speed) obtained in advance by experiment and the like.

CITATION LIST

Patent Literature

Patent Document 1: JPH9-96238A
Patent Document 2: JP2007-170405A
Patent Document 3: JPH8-261033A
Patent Document 4: JP2010-71126A

SUMMARY

Technical Problem

As described above, the deposit accumulated inside the cylinder increases the compression ratio, causing $NO_X$, CO, HC, etc in the exhaust gas to show an increasing trend. Since there is a correlation between the deposit deposition amount and the increase in the actual compression ratio, it is effective to detect the actual compression ratio for determining the deposit deposition amount.

However, it is difficult to determine the deposit deposition amount accurately by the determination or estimation means disclosed in Patent Documents 3 and 4, because they do not determine the deposit deposition amount by calculating the actual compression ratio from the actual detected result of the cylinder internal pressure.

In view of the above problems of the prior arts, it is an object of the present invention to keep the exhaust gas property not greater than the regulation value and to reduce running cost of the internal combustion engine and maintenance cost for removing the deposit by accurately detecting the deposit deposition amount inside the cylinder with a simple and low-cost means and performing such operation that reduces the deposit deposition amount.

Solution to Problem

In order to achieve the above object, the combustion control device of an internal combustion engine according to the present invention comprises:

a cylinder internal pressure sensor for detecting a pressure inside a combustion chamber;

an actual compression ratio calculation unit for calculating an actual compression ratio based on a cylinder pressure before compression and a cylinder pressure before ignition detected by the cylinder internal pressure sensor;

a deposit deposition amount estimation unit for comparing the calculated actual compression ratio with a design compression ratio at a same crank angle as a crank angle upon detection of the cylinder pressure before ignition and estimating a deposit deposition amount in a cylinder from a deviation between the calculated actual compression ratio and the design compression ratio; and an operation condition correction unit for correcting an operation condition of the internal combustion engine when the deviation exceeds a threshold value.

According to the present invention, the actual compression ratio is calculated from the cylinder pressure before compression and the cylinder pressure before ignition detected by the internal cylinder pressure sensor. It is possible to accurately determine the deposit deposition amount in the cylinder from the deviation between the actual compression ratio and the design compression ratio. Also, there is provided a threshold value for the deviation and the operation conditions are corrected by the operation conditions correction unit when the deviation exceeds this threshold value. Thus, it is possible to maintain the exhaust gas not greater than the regulation value by correcting the operation conditions even when the exhaust gas property tends to deteriorate due to the deposit deposition.

In this manner, it is possible to reduce the deterioration of the exhaust gas property caused by the change due to aging within the regulation value. Thus, it is possible to set the operation conditions of the internal combustion engine to be such conditions that achieve high efficiency with a small margin (for instance, advanced ignition timing, enriched air-fuel ratio, etc). As a result, it is possible to reduce running cost such as the cost of fuel used upon operation. Also, as it is possible to expand the interval of maintenance for removing the deposit, it is possible to reduce maintenance cost.

In the present invention, the combustion control device may further comprise an air supply temperature sensor, wherein the actual compression ratio calculation unit is configured to calculate the actual compression ratio by deriving a value κ from the cylinder pressure before compression, the cylinder pressure before ignition, and an air supply temperature detected by the air supply temperature sensor using a correlation of $PV^{\kappa}$=constant, being a state equation of ideal gas in an adiabatic compression. As a result, it is possible to calculate the actual compression ratio easily and accurately.

Also, the operation condition being a correction target of the operation condition correction unit includes an ignition timing and it is possible to securely correct the detrimental substance included in the exhaust gas such as $NO_X$ to be not greater than the regulation value by correcting the ignition timing to be retarded when the deviation exceeds the threshold value.

Moreover, the operation condition being a correction target of the operation condition correction unit may include an air-fuel ratio, and it is possible to securely correct the exhaust gas such as $NO_X$ to be not greater than the regulation value by correcting the air-fuel ratio to be larger when the deviation exceeds the threshold value.

Further, the combustion control device may further comprise: a warning device for issuing a warning when the deviation exceeds a first threshold value; and an engine stop unit for determining that a target cylinder is under an abnormal state and stopping the target cylinder or the internal combustion engine when the deviation exceeds a second threshold value which is larger than the first threshold value. As a result, it is possible to issue a warning before the exhaust gas property exceeds the regulation value due to increase in the deposit deposition amount, and also to promptly take measures upon the exhaust gas property exceeding the regulation value.

In the present invention, the actual compression ratio calculation unit may be configured to calculate a moving average of the detected cylinder pressure before compression or the detected cylinder pressure before ignition, and to calculate the actual compression ratio using the moving average. As a result, it is possible to eliminate the effect of the transient abnormal combustion or the momentary noise of the detected result of the cylinder pressure before compression or the cylinder pressure before ignition, and thus to calculate a reliable actual compression ratio.

Also, the combustion control device may further comprise an air supply pressure sensor for detecting an air supply pressure, wherein the actual compression ratio calculation unit is configured to calculate an absolute pressure of the cylinder pressure before ignition ($Pc=Ps+\Delta P$) by adding an air supply pressure detected by the air supply pressure sensor (Ps) a difference between the cylinder pressure before compression and the cylinder pressure before ignition detected by the cylinder internal pressure sensor ($\Delta P$), and to calculate the actual compression ratio using the air supply pressure (Ps) and the calculated cylinder pressure before ignition (Pc).

As a result, it is possible to eliminate the effect of the drift of the cylinder internal sensor by calculating an absolute pressure of a cylinder pressure before ignition ($Pc=Ps+\Delta P$) of the cylinder internal pressure using the difference (deviation) of the detected result of the cylinder internal sensor and the detected result of the air supply pressure sensor and using the cylinder pressure before ignition (Pc), even when an accurately absolute pressure value can no longer be detected due to the drift of the detected value caused by deterioration and the like of the cylinder internal pressure sensor itself. Accordingly, it is possible to calculate a reliable actual compression ratio.

Also, a combustion control method for an internal combustion engine according to the present invention comprises: an actual compression ratio calculation step of calculating an actual compression ratio based on a cylinder pressure before compression and a cylinder pressure before ignition detected by a cylinder internal pressure sensor; a deposit deposition amount estimation step of comparing the calculated actual compression ratio to a design compression ratio at a same crank angle as a crank angle upon detection of the cylinder pressure before ignition and estimating a deposit deposition amount in a cylinder from a deviation between the calculated actual compression ratio and the design compression ratio; and an operation condition correction step of correcting an operation condition of the internal combustion engine when the deviation exceeds a threshold value.

According to the above method, similarly to the invention of the combustion control device described above, it is possible to accurately determine the deposit deposition amount in the cylinder from the deviation between the actual compression ratio and the design compression ratio. Also, even when the exhaust gas property tends to deteriorate due to the deposit deposition, it is possible to maintain the exhaust gas not greater than the regulation value by correcting the operation conditions with the operation conditions correcting unit upon the deviation exceeding the threshold value.

In this manner, it is possible to reduce deterioration of the exhaust gas property caused by change due to aging within the regulation value. Thus, it is possible to set the operation conditions of the internal combustion engine to be such conditions that achieve high efficiency with a small margin with respect to the regulation value of exhaust gas (for instance, advanced ignition timing, enriched air-fuel ratio, and the like). As a result, it is possible to reduce running cost such as the cost of fuel used for operation. Also, for an engine with operation conditions where the deposit deposition amount is small, it is possible to reduce maintenance cost because it is possible to expand the interval of maintenance for removing the deposit.

Advantageous Effects

According to the present invention, it is possible to keep the exhaust gas property not greater than the regulation value and also to reduce the running cost and the maintenance cost for removing the deposit of the internal combustion engine by detecting the deposit deposition amount inside the cylinder accurately with a simple and low-cost means and performing such operation that reduces the deposit deposition amount. The present invention can be employed for an internal combustion in general, such as the gas engine, the diesel engine, and the gasoline engine.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
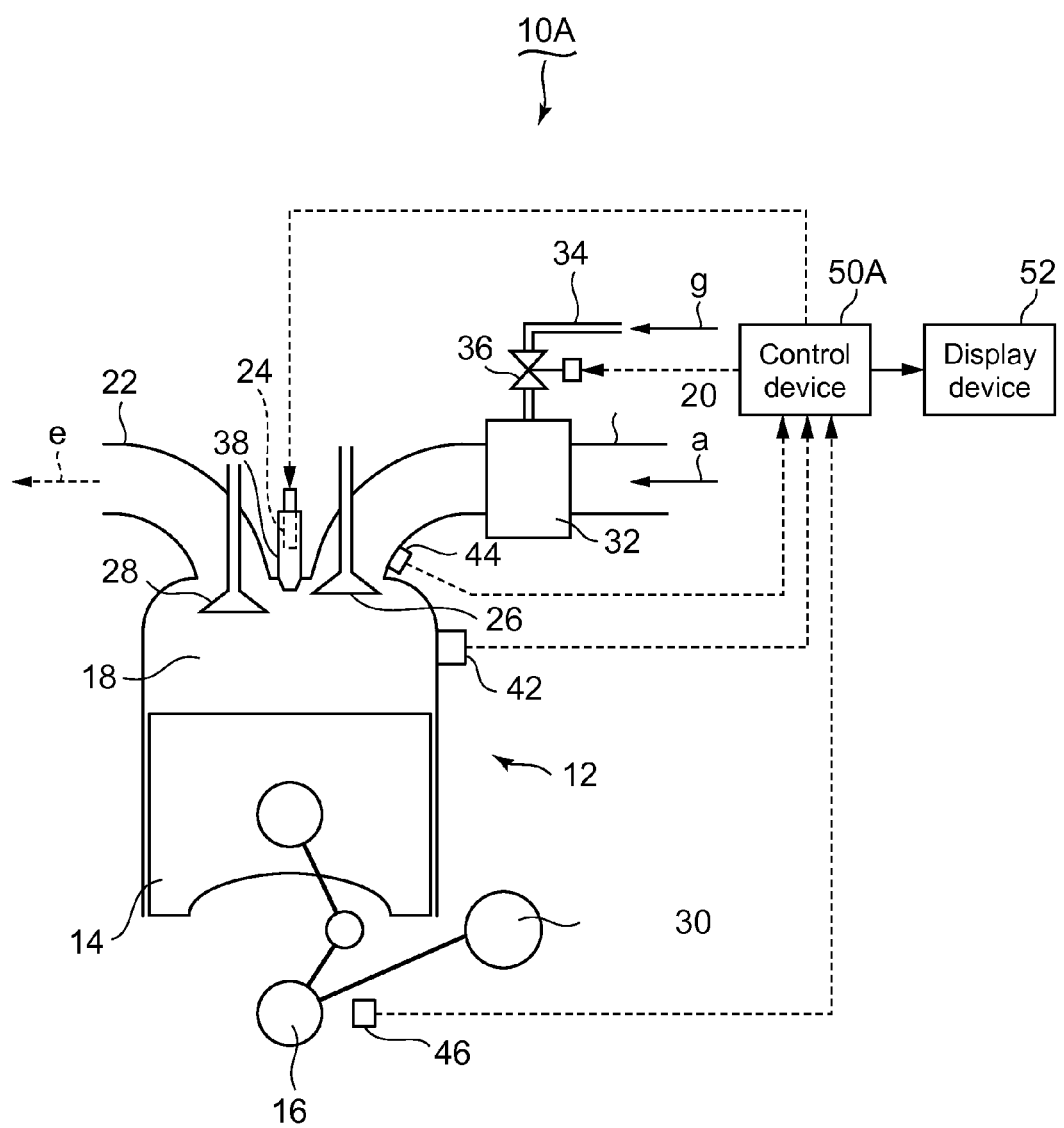
FIG. 1 is a configuration diagram of the stationary gas engine according to the first embodiment of the present invention.

The first embodiment where the present invention is employed for a stationary gas engine will be described in reference to FIGS. 1 to 6. In FIG. 1, illustrated is a cylinder 12 included in a stationary gas engine 10A having a plurality of cylinders. In FIG. 1, a piston 14 is reciprocated by a crank shaft 16 inside the cylinder 12. A combustion chamber 18 is formed above the piston 14. An air supply pipe 20 and an air discharge pipe 22 are connected to the cylinder head, an auxiliary chamber 38 is provided for the central part of the cylinder head, and an ignition device 24 is provided inside the auxiliary chamber 38. An air supply valve 26 is provided for the opening of the air supply pipe 20, and an air discharge valve 28 is provided for the opening of the air discharge pipe 22.

A generator 30 is driven by rotation of the crank shaft 16. A gas injection device 32 is provided halfway into the air supply pipe 20 for injecting fuel gas "g" to the air "a" which flows inside the air supply pipe 20. A gas supply pipe 34 is connected to the gas injection device 32 for supplying the fuel gas to the gas injection device 32 from the fuel gas tank (not shown). A gas supply electromagnetic valve 36 is provided for the gas supply pipe 34 at the inlet of the gas injection device 32. The flame ignited in the auxiliary chamber 38 is injected into the combustion chamber 18, whereby the lean mixture gas of the main combustion chamber side is combusted. The exhaust gas "e" after having combusted is discharged from the air discharge pipe 22.

A cylinder internal pressure sensor 42 is provided for the cylinder 12 for detecting the pressure of the combustion chamber 18. An air supply temperature sensor 44 is provided for the air supply pipe 20 at the upstream side of the air supply valve 26 for detecting the air supply temperature. Also, a crank angle sensor 46 for detecting the crank angle of the crank shaft 16 is provided. The detected signals of the above sensors are transmitted to a control device 50A. The control device 50A is configured to control the ignition timing of the ignition device 24 and also to control the air-fuel ratio of fuel gas supplied to the cylinder 12 by controlling the opening degree of the gas supply electromagnetic valve 36.

Figure 2:
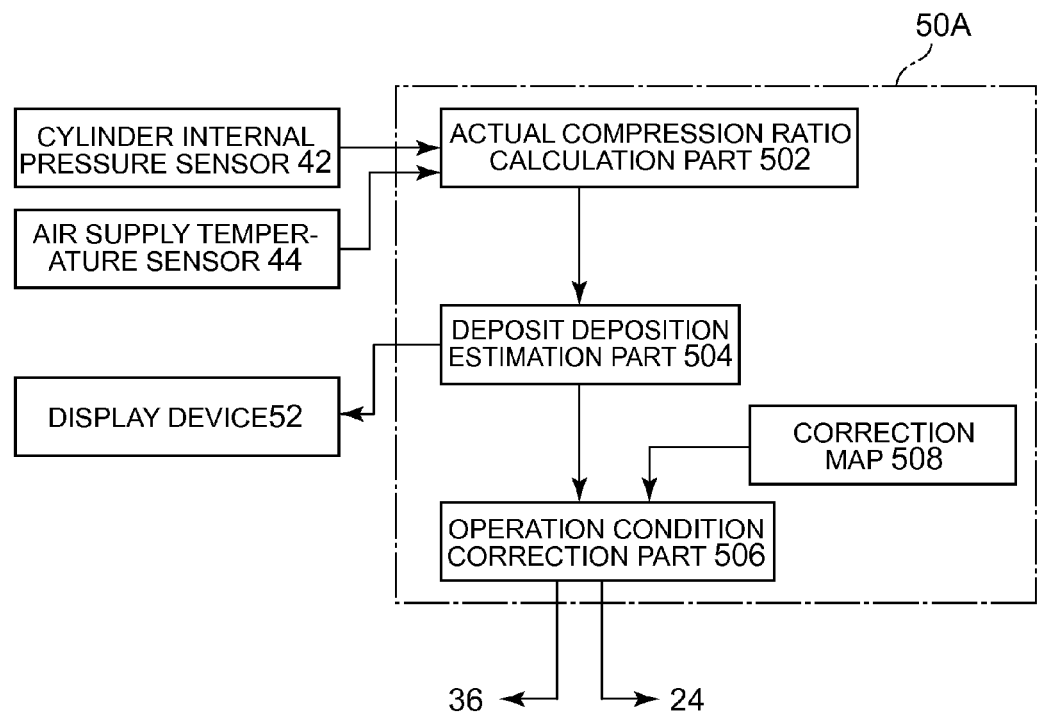
FIG. 2 is a block diagram of the control device according to the first embodiment.

In FIG. 2, shown is the configuration of the control device 50A. Cylinder pressure before compression (air supply pressure) Ps and cylinder pressure before ignition Pc detected by the cylinder internal pressure sensor 42, and air supply temperature Ts detected by the air supply temperature sensor 44 are inputted into an actual compression ratio calculation unit 502, which then calculates the actual compression ratio from the detected results of the above.

A deposit deposition amount estimation unit 504 is configured to compare the actual compression ratio calculated by the actual compression ratio calculation unit 502 to a design compression ratio at a same crank angle as the crank angle upon the cylinder pressure before ignition Pc, and to estimate the deposit deposition amount in the cylinder from the deviation between the calculated actual compression ratio and the design compression ratio.

An operation condition correction unit 506 is configured to correct the ignition timing of the ignition device 24 based on the correction map 508 when the deviation exceeds the threshold value.

Figure 3:
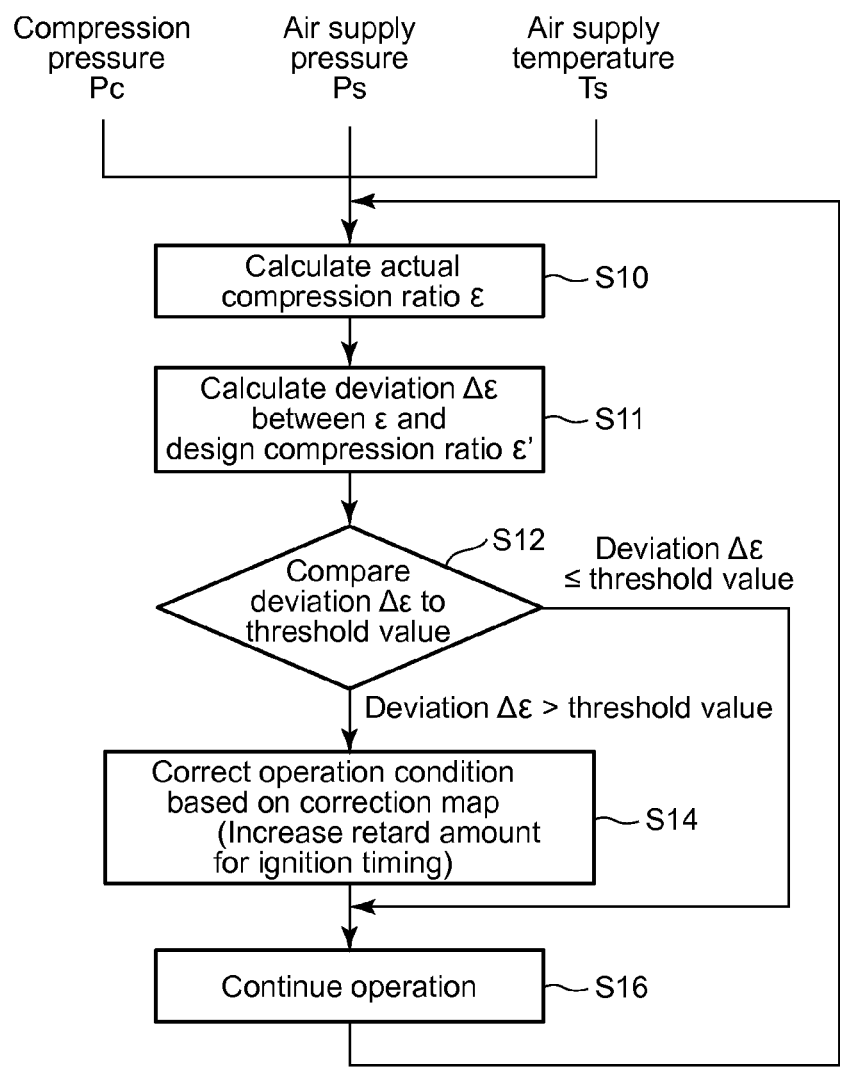
FIG. 3 is a flow chart of the operation control procedures according to the first embodiment.
Figure 4:
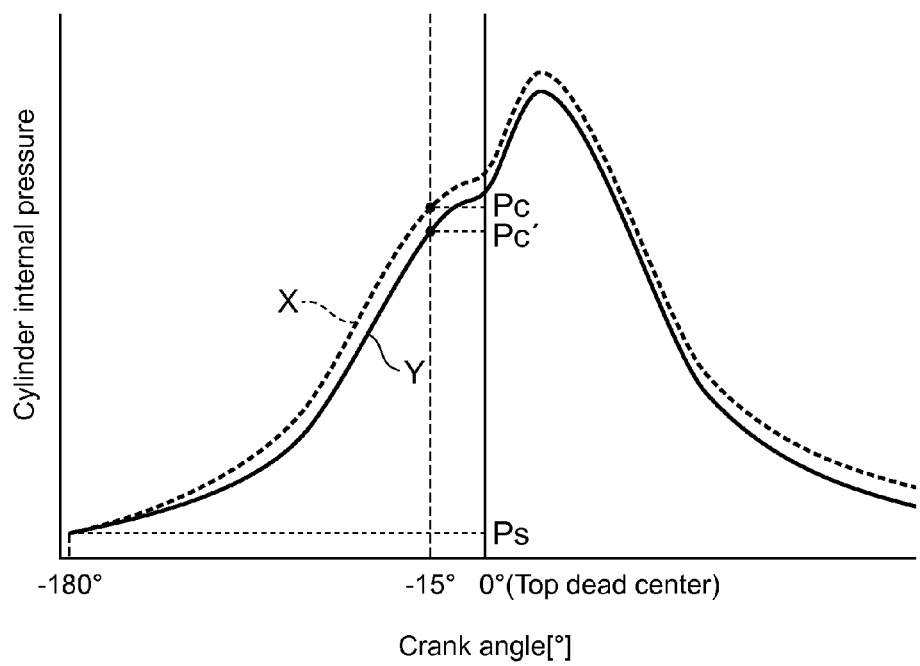
FIG. 4 is a diagram of the cylinder internal pressure of the stationary gas engine according to the first embodiment.

According to the above configuration, the combustion control procedures of the present embodiment will be described in reference to FIG. 3. In the actual compression ratio calculation unit 502, the actual compression ratio $\epsilon$ is calculated from the cylinder pressure before ignition Pc and the air supply pressure Ps detected by the cylinder internal pressure sensor 42, and the air supply temperature Ts detected by the air supply temperature sensor 44 (S10). As shown in FIG. 4, the air supply pressure Ps is the cylinder internal pressure in the intake stroke before entering the compression stroke. The cylinder pressure before ignition Pc is the compression pressure at a certain crank angle before ignition in the compression stroke. For instance, as shown in FIG. 4, the compression pressure at minus 15 degrees to the top dead point is selected.

The calculation method for the actual compression ratio $\epsilon$ uses the correlation of $PV^\kappa$=constant, which is a state equation of ideal gas in an adiabatic compression. From this correlation, following equation (1) can be derived:

$$Ps \times Vs^\kappa = Pc \times Vc^\kappa$$

$$\epsilon = Vs/Vc = (Pc/Ps)^{1/\kappa} \quad (1)$$

where Vs is the cylinder volume before compression, Vc is the cylinder volume before ignition in the compression stroke, κ is a specific heat ratio of an operating gas, which is referred to as a combustion gas herein, and E is the actual compression ratio. The actual compression ratio ϵ can be calculated by substituting Pc and Ps detected by the cylinder internal pressure sensor 42, the air supply temperature Ts, and the value of κ corrected based on Pc and Ps into the equation (1). Herein, the absolute pressure is used for the cylinder internal pressures Pc and Ps.

Also, the design compression ratio ϵ' can be calculated by following equation (2):

$$\epsilon' = Vs'/Vc' \quad (2)$$

where Vs' is a design value of the cylinder internal volume at the bottom dead point (minus 180 degrees) and Vc' is a design value of the cylinder internal volume at minus 15 degrees to the top dead point.

In FIG. 4, schematically shown are the waveform X of the cylinder internal pressure for the case where there is deposit deposition in the combustion chamber 18 and the waveform Y of the cylinder internal pressure for the case where there is no deposit deposition in the combustion chamber 18. In accordance with the increase in the deposit deposition, the volume of the combustion chamber 18 decreases, thus causing the cylinder internal pressure to show an increasing trend. Therefore, the cylinder pressure before ignition Pc in the case where there is deposit deposition increases more than the design cylinder pressure before ignition Pc' in the case where there is no deposit deposition.

Figure 5:
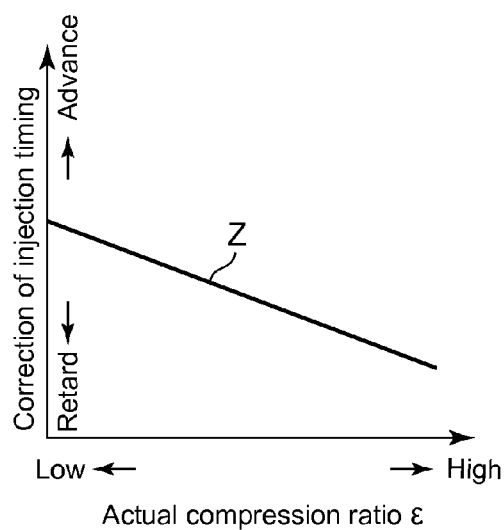
FIG. 5 is a diagram of the correction map for the operation conditions according to the first embodiment.

Referring back to FIG. 3, subsequently in the deposit deposition amount estimation unit 504, a deviation Δϵ between the calculated actual compression ratio ϵ and the design compression ratio ϵ' is calculated (S11), and then this deviation Δϵ is compared to the threshold value (S12). The threshold is set with a margin to the limit value where the exhaust gas property does not exceed the regulation value. When the deviation Δϵ does not exceed the threshold value, operation is continued without change (S16). When the deviation Δϵ exceeds the threshold value, the operation conditions are corrected in the operation condition correction unit 506 based on a correction map 508. That is, the retard amount for the ignition timing of the ignition device 24 is increased (S14). FIG. 5 illustrates an example of the correction map 508. As shown in FIG. 5, along the correction curve Z in FIG. 5, the ignition timing is retarded when the actual compression ratio ϵ increases compared to the design compression ratio ϵ'. The above operation control procedures are continuously repeated every operation cycle (every compression stroke) for every cylinder.

For instance, when the design compression ratio ϵ' of 10.0 in the stationary gas engine 10, as a result of setting the threshold value of the deviation Δϵ between the design compression ratio ϵ' and the actual compression ratio ϵ to 0.1, the operation control is performed so that the actual compression ratio ϵ does not exceed 10.1.

In the present embodiment, in addition to controlling the ignition timing of the ignition device 24 with the control device 50A, the air-fuel ratio of the mixture gas supplied to the combustion chamber 18 may be controlled by controlling the opening degree of the gas supply electromagnetic valve 36. In the above case of the air-fuel ratio control, when the deviation Δϵ exceeds the threshold value, the exhaust gas property, that is the amount of $NO_X$ in the exhaust gas for instance, may be corrected to be not greater than the regulation value by controlling the opening degree of the gas supply electromagnetic valve 36 to the closed side so as to increase the air-fuel ratio. As described above, it is possible to accurately control the exhaust gas property by correcting the ignition timing and the air-fuel ratio.

Herein, the deposit deposition state determined by calculation by the deposit deposition amount estimation unit 504 is displayed by the display device 52.

According to the present embodiment, it is possible to calculate the actual compression ratio ϵ with a simple and low-cost means of merely providing the cylinder internal sensor 42 and the air supply temperature sensor 44. Also, it is possible to determine the deposit deposition state in the combustion chamber 18 by only monitoring the deviation Δϵ between the actual compression ratio ϵ and the design compression ratio ϵ'.

Accordingly, even when the exhaust gas property deteriorates due to the deposit deposition, it is possible to keep the change small in the exhaust gas property due to the deposit deposition by correcting the ignition timing of the ignition device 24 and, when necessary, by correcting the air-fuel ratio by adjusting the opening degree of the gas supply electromagnetic valve 36 with the control unit 50A.

Figure 6A:
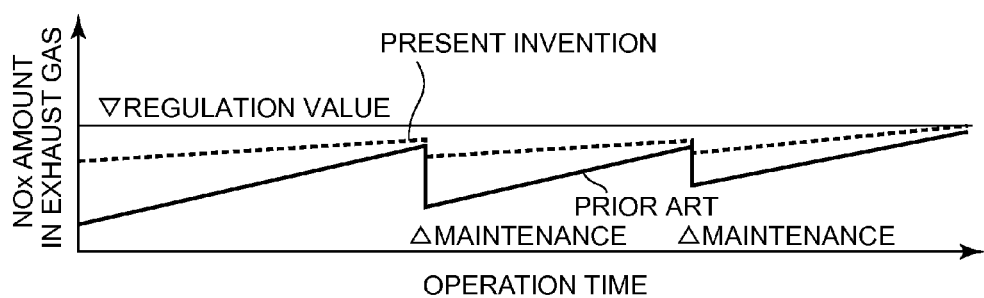
FIG. 6A is a diagram of the frequency of maintenance for the stationary gas engine according to the first embodiment where y-axis is the amount of $NO_X$ in the exhaust gas.
Figure 6B:
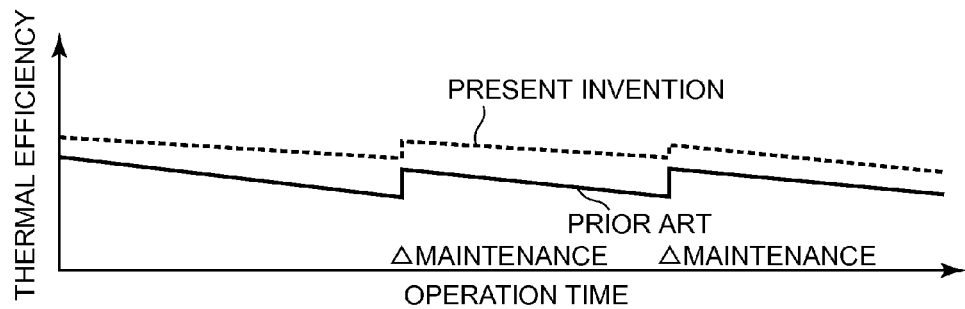
FIG. 6B is a diagram of the frequency of maintenance for the stationary gas engine according to the first embodiment where y-axis is the thermal efficiency.

As a result, as shown in FIG. 6A with the dotted line, it is possible to perform operation under the setting with high efficiency where there is a small margin to the regulation value of $NO_X$ (specifically, advanced ignition timing or enriched air-fuel ratio). Thus, as shown in FIG. 6B with the dotted line, it is possible to perform operation with high thermal efficiency. Herein, FIG. 6A is a diagram of the frequency of maintenance where y-axis is the amount of $NO_X$ in the exhaust gas, and FIG. 6B is a diagram of the frequency of maintenance where y-axis is the thermal efficiency.

Accordingly, it is possible to reduce running cost such as the fuel cost and also to expand the interval of maintenance for removing the deposit, which makes it possible to reduce maintenance cost.

Second Embodiment

Figure 7:
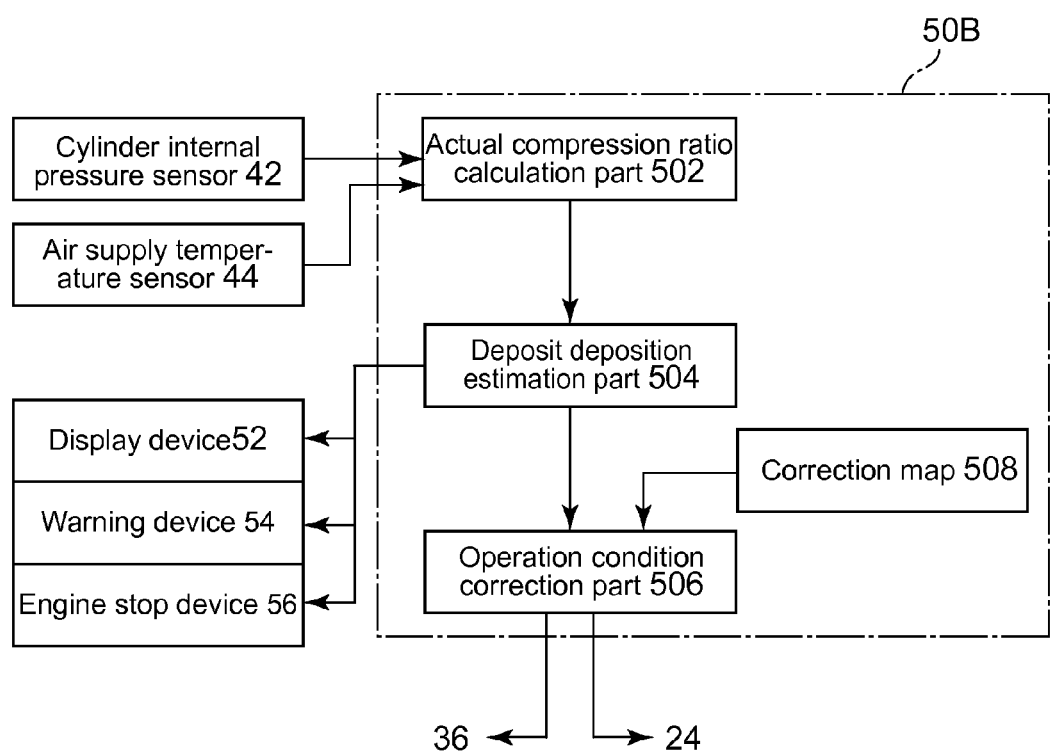
FIG. 7 is a block diagram of the control device according to the second embodiment of the present invention.
Figure 8:
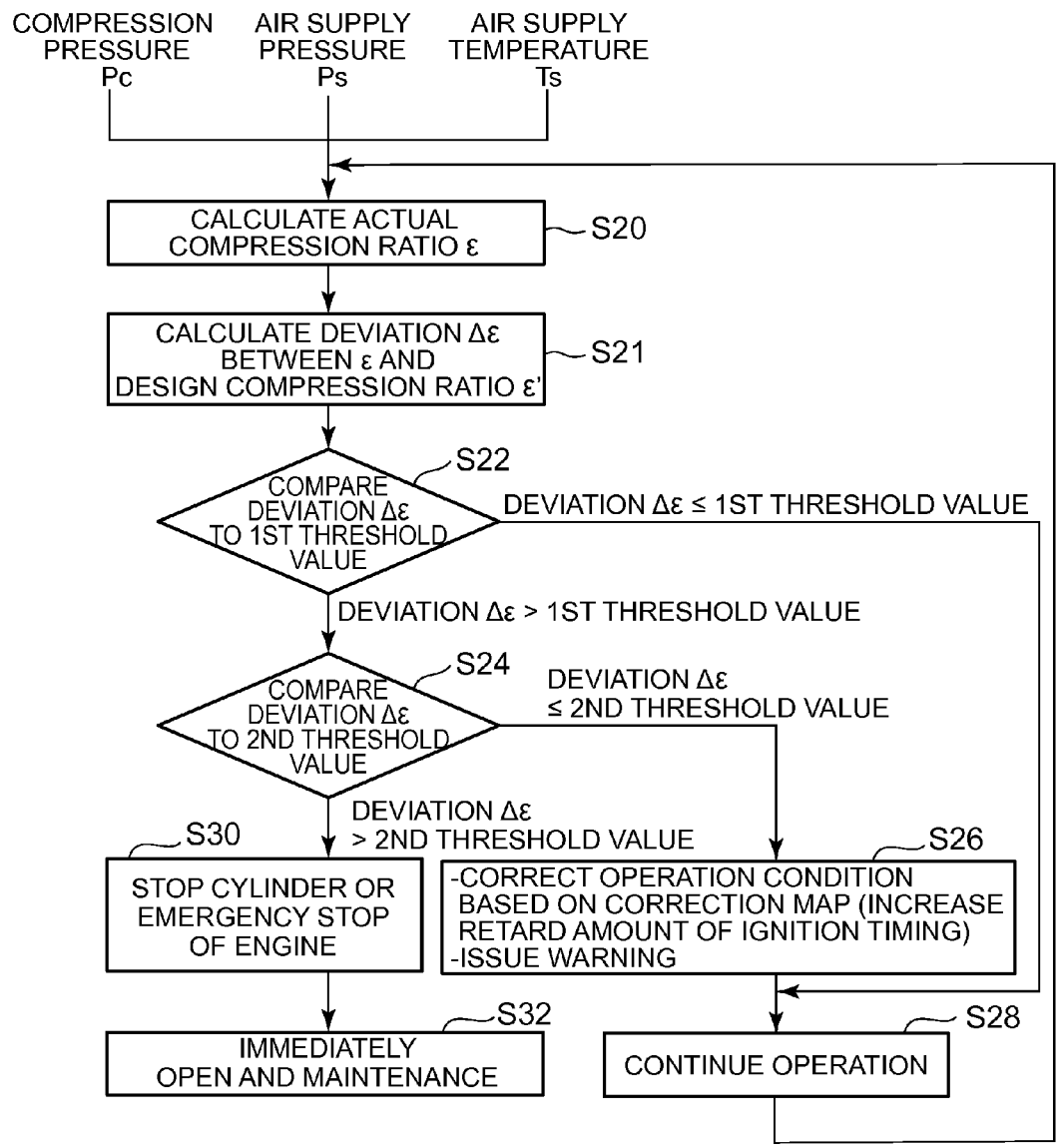
FIG. 8 is a flow chart of the operation control procedures according to the second embodiment.
Figure 9:
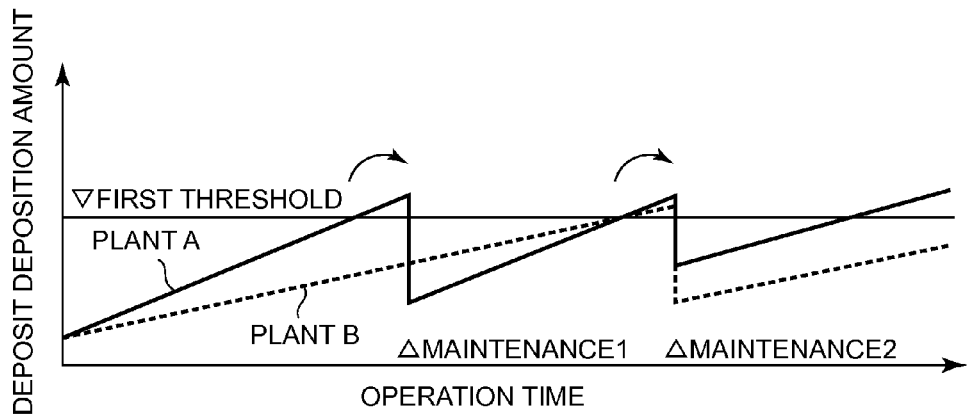
FIG. 9 is a diagram of the frequency of maintenance for the stationary gas engine according to the second embodiment.

Next, the second embodiment of the present invention will be described in reference to FIGS. 7 to 9. The present embodiment is an example employed for a stationary gas engine having the configuration similar to that of the first embodiment. FIG. 7 illustrates the configuration of the control device 50B of the present embodiment. The control device 50B further includes a warning device 54 and an engine stop device 56 in addition to the configuration of the control device 50A of the first embodiment. The warning device 54 is provided for a place such as the monitoring room where information can be delivered to the operators and other relevant persons.

The combustion control procedures of the control unit 50B will be described in reference to FIG. 8. First, similarly to the first embodiment, the actual compression ratio ϵ in the cylinder 12 is calculated from the compression pressure Pc, the air supply pressure Ps and the air supply temperature Ts (S20). Next, similarly to the first embodiment, the actual compression ratio ϵ is compared to the design compression ratio ϵ' at the same crank angle as the crank angle upon the actual compression ratio ϵ, and the deviation Δϵ between the above is calculated (S21). Then, the deviation Δϵ is compared to the first threshold (S22). The first threshold value may be the same value as, or a different value from the threshold value in the first embodiment. When the deviation Δε does not exceed the first threshold value, the operation is continued without change (S28).

When the deviation Δε exceeds the first threshold value, the deviation Δε is compared to the second threshold value (S24). The second threshold value is larger than the first threshold value, being a limit value above which the exhaust gas property exceeds the regulation value. For instance, when the design compression ratio of the stationary gas engine 10 is 10.0, the first threshold value is set to 0.1 and the threshold value is set to 0.2. When the deviation Δε≤the second threshold value, the operation conditions are corrected based on the correction map 508. That is, the retard amount of the ignition timing is increased. At the same time, a warning is issued by the warning device 54 (S26). When a warning is issued, the combustion chamber 18 of the corresponding cylinder 12 is cleaned in next maintenance. When the deviation Δε>the second threshold value, the corresponding cylinder 12 or the entire engine is stopped (S30). Then, the stationary gas engine 10 is immediately disassembled for maintenance. The above operation control procedures are continuously repeated every operation cycle (every compression stroke) and for every cylinder.

According to the present embodiment, in addition to the advantageous effects attained by the first embodiment, it is possible to accurately determine whether the combustion chamber needs to be cleaned upon performing maintenance for each cylinder based on the deposit deposition state, and thus to minimize the maintenance cost. For instance, as shown in FIG. 9, for a plant A with more deposit deposition amount and a plant B with less deposit deposition amount, only the plant whose deposit deposition amount exceeds the first threshold value is cleaned in Maintenance 1. Next, the plants A and B are cleaned because the deposit deposition amount of the plants A and B exceed the first threshold value upon Maintenance B. As a result, the number of cleaning can be minimized according to the need of each plant.

Further, it is possible to accurately monitor the deposit deposition state for each cylinder and to early find trouble of the fuel system or the lubricant system of a certain cylinder, thus preventing serious accidents from happening such as damage to the engine.

Third Embodiment

Subsequently, the third embodiment of the present invention will be described in reference to FIG. 10. In the present embodiment, the moving average of the detected result of the actual compression ratio ε is used for reducing the effect of the change in the detected result of each operation cycle (each compressions stroke).

Figure 10:
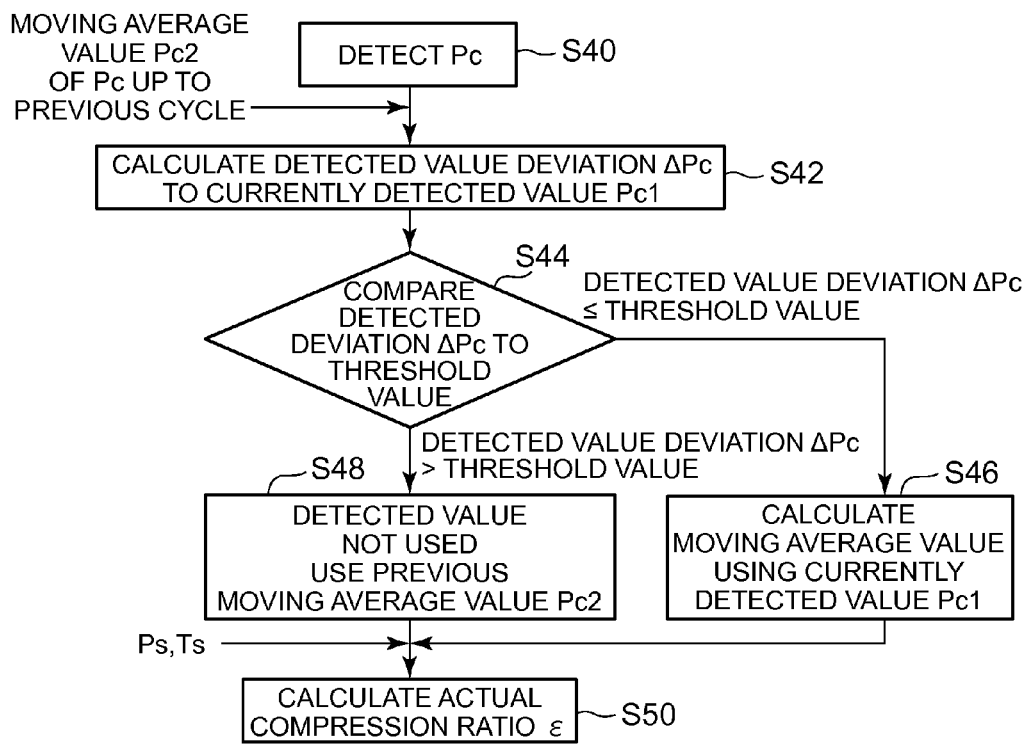
FIG. 10 a flow chart of the operation control procedures for the stationary gas engine according to the third embodiment of the present invention.

As shown in FIG. 10, first, the cylinder pressure before ignition Pc is detected (S40). Next, the detected value deviation ΔPc between the detected cylinder pressure before ignition Pc1 and the moving average of cylinder pressure before ignition taken up to the previous calculation cycle, Pc2, is calculated (S42). This detected result deviation ΔPc is compared to the threshold value (S44). When the detected value deviation ΔPc≤the threshold value, the currently detected cylinder pressure before ignition Pc1 is used for calculating the moving average including the cylinder pressure before ignition Pc1 (S46). On the other hand, when the detected value deviation ΔPc>the threshold value, the currently detected cylinder pressure before ignition Pc1 is not used, and the moving average value of the cylinder pressure before ignition taken up to the previous calculation cycle, Pc2, is used (S48).

Next, the actual compression ratio ε is calculated from the cylinder pressure before ignition Pc, and the air supply pressure Ps and air supply temperature Ts separately detected (S50). Using the calculated actual compression ratio ε, the control cycle is repeated by the control procedures of the first embodiment shown in FIG. 3, or the control procedures of the second embodiment shown in FIG. 8.

According to the present embodiment, by removing the detected values such that the detected value deviation is large compared to the moving average value when detecting the cylinder pressure before ignition Pc, it is possible to eliminate momentary noise in the detected value of the cylinder pressure before ignition Pc, or the transient abnormal combustion. As a result, it is possible to calculate a reliable actual compression ratio ε from which the microscopic fluctuation during operation is removed.

While the above embodiment illustrates the case where the actual compression ratio ε is averaged using the moving average of the detected result of the cylinder pressure before ignition Pc, the moving average of the actual compression ratio ε calculated for each operation cycle may be used for averaging, whereby the momentary noise or the influence of the transient abnormal combustion are eliminated.

Fourth Embodiment

Next, the fourth embodiment of the present invention will be described in reference to FIG. 11. In the present embodiment, for the cylinder pressure before ignition Pc, the absolute pressure calculated based on the difference from the pressure before the compression stroke and the air supply pressure Ps of the detected signal from the air supply pressure sensor 48 instead of using the detected value itself, in order to eliminate the influence of the drift of the cylinder internal sensor 42.

Figure 11:
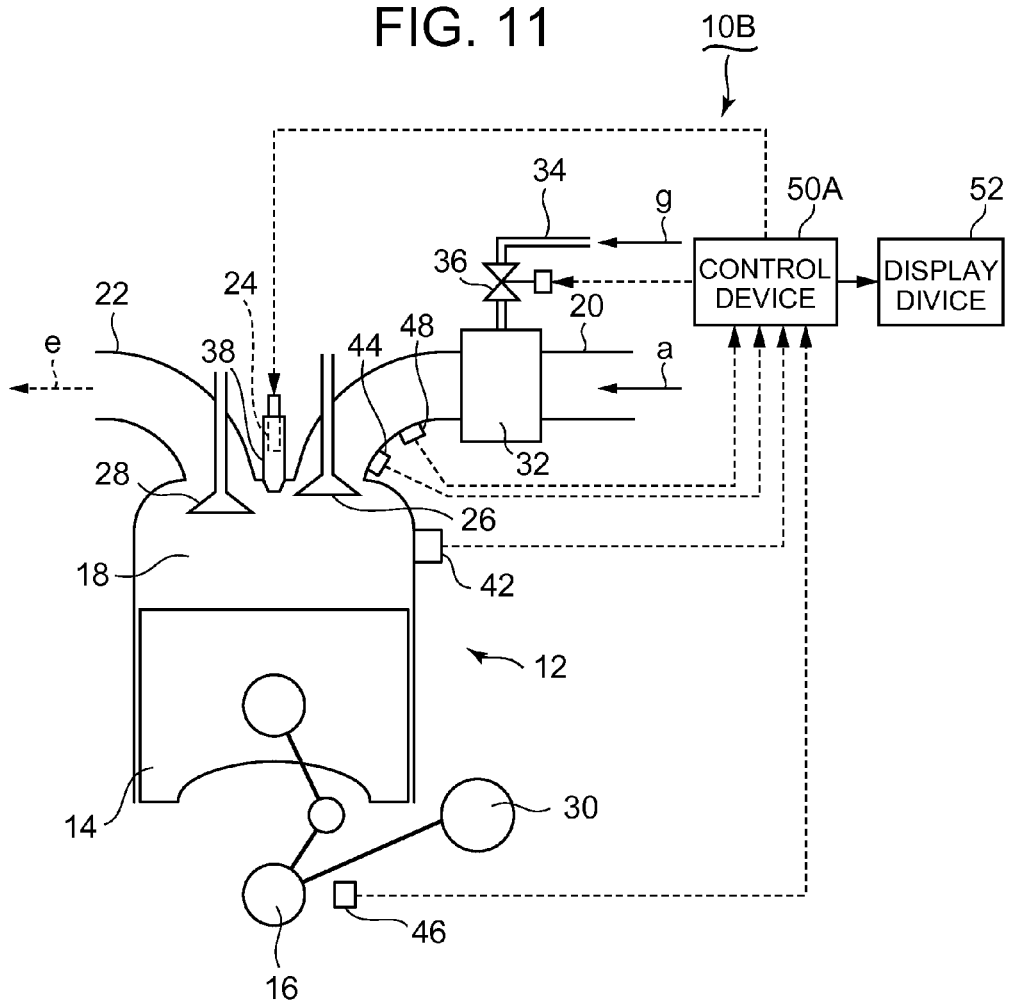
FIG. 11 is a diagram according to the fourth embodiment of the present invention, which corresponds to FIG. 1.
Figure 12:
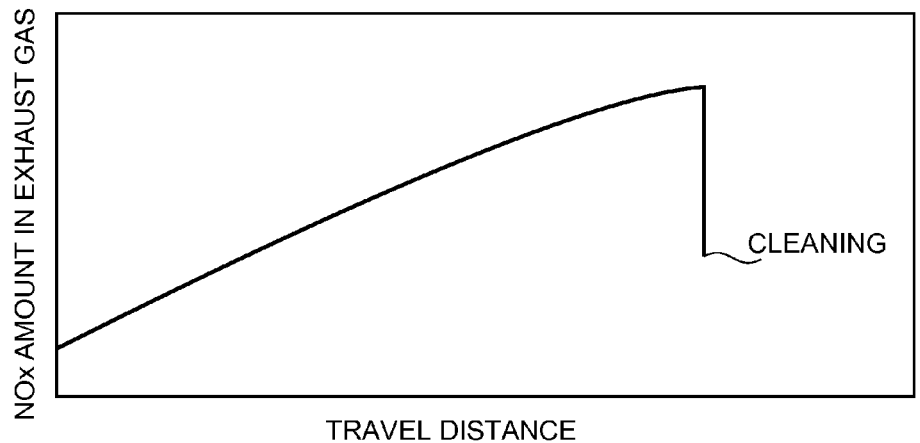
FIG. 12 is a diagram of the change of the amount of $NO_X$ in the exhaust gas of an automobile with respect to travel distance.

As shown in FIG. 11, the air supply pressure sensor 48 for detecting the air supply pressure which flows into the combustion chamber 18 is provided for the air supply pipe 20 on the downstream side of the gas injection device 32. In the actual compression ratio calculation part 502, the air supply pressure Ps detected by the air supply pressure sensor 48 is used as the cylinder pressure before compression, and the air supply pressure Ps detected by the air supply pressure sensor 48 is added to the difference between the cylinder pressure before compression and the cylinder pressure before ignition detected by the cylinder internal pressure sensor 42 (ΔP). As a result, the absolute pressure value of the cylinder pressure before ignition (Pc=Pa+ΔP) is calculated.

The actual compression ratio ε is calculated using the air supply pressure Ps and the cylinder pressure before ignition Pc calculated by the above addition.

As a result, even when the detected value drifts due to aging of the cylinder internal sensor 42 itself and an accurate absolute pressure value can no longer be detected, it is possible to calculate a reliable actual compression ratio by eliminating the influence of the drift of the cylinder internal pressure sensor 42 by calculating the absolute pressure of the cylinder pressure before ignition (Pc=Ps+ΔP) of the cylinder internal pressure using the difference (deviation) of the detected value of the cylinder internal sensor 42 and the detected value from the air supply pressure sensor 48 and by using the cylinder pressure before ignition Pc.

INDUSTRIAL APPLICABILITY

According to the present invention, it is possible to keep the exhaust gas property not greater than the regulation value by detecting the deposit deposition amount inside the cylinder with a simple and low-cost means and performing such operation that reduces the deposit deposition amount. The present invention may be applied to an internal combustion engine in general, such as the gas engine, the diesel engine, the gasoline engine, and the like.

REFERENCE SIGNS LIST 10A, 10B Stationary gas engine
12 Cylinder
14 Piston
16 Crank shaft
18 Combustion chamber 18
20 Air supply pipe
22 Air discharge pipe
24 Ignition device
26 Air supply valve
28 Air discharge valve
30 Generator
32 Gas injector
34 Gas supply pipe
36 Gas supply electromagnetic valve
38 Auxiliary chamber
42 Cylinder internal pressure sensor
44 Air supply temperature sensor
46 Crank angle sensor
48 Air supply pressure sensor
59A, 50B Control device
   502 Actual compression ratio calculation unit
   504 Deposit determination unit
   506 Operation condition correction unit
   508 Correction map
52 Display device
54 Warning device
56 Engine stop device
Pc, Pc', Pc1, Pc2 Cylinder pressure before ignition
Ps Cylinder pressure before compression (Air supply pressure)
Ts Air supply temperature
X Compression pressure (with deposit deposition)
Y Compression pressure (without deposit deposition)
a Air
g Fuel gas
e Exhaust gas
$\epsilon$ Actual compression ratio
$\epsilon'$ Design compression ratio

The invention claimed is:

1. A combustion control device for an internal combustion engine comprising:
   a cylinder internal pressure sensor for detecting a pressure inside a cylinder;
   an actual compression ratio calculation unit for calculating an actual compression ratio $\epsilon$ from a calculation formula of $\epsilon=(Pc/Ps)^{1/\kappa}$, where $\kappa$ is a specific heat ratio of an operating gas, based on a cylinder pressure before compression (Ps) and a cylinder pressure before ignition (Pc) detected by the cylinder internal pressure sensor;
   a deposit deposition amount estimation unit for calculating a design compression ratio $\epsilon'$ from a calculation formula of $\epsilon'=Vs'/Vc'$, where Vs' is a design value of a cylinder internal volume before compression and Vc' is a design value of a cylinder internal volume at a same crank angle as a crank angle upon detection of the cylinder pressure before ignition, and estimating a deposit deposition amount in the cylinder from a deviation between the calculated actual compression ratio $\epsilon$ and the design compression ratio $\epsilon'$ by comparing the actual compression ratio $\epsilon$ and the design compression ratio $\epsilon'$; and
   an operation condition correction unit for correcting an operation condition of the internal combustion engine when the deviation exceeds a threshold value.

2. The combustion control device for an internal combustion engine according to claim 1, further comprising an air supply temperature sensor,
   wherein the actual compression ratio calculation unit is configured to calculate the actual compression ratio by deriving a value $\kappa$ from the cylinder pressure before compression, the cylinder pressure before ignition, and an air supply temperature detected by the air supply temperature sensor using a correlation of $PV^\kappa$=constant, being a state equation of ideal gas in an adiabatic compression.

3. The combustion control device for an internal combustion engine according to claim 1,
   wherein the operation condition being a correction target of the operation condition correction unit includes an ignition timing, and
   wherein the operation condition unit is configured to correct the operation condition such that the ignition timing is retarded when the deviation exceeds the threshold value.

4. The combustion control device for an internal combustion engine according to claim 1,
   wherein the operation condition being a correction target of the operation condition correction unit includes an air-fuel ratio, and
   wherein the operation condition unit is configured to correct the operation condition such that the air-fuel ratio is increased when the deviation exceeds the threshold value.

5. The combustion control device for an internal combustion engine according to claim 1, further comprising:
   a warning device for issuing a warning when the deviation exceeds a first threshold value; and
   an engine stop unit for determining that a target cylinder is under an abnormal state and stopping the target cylinder or the internal combustion engine when the deviation exceeds a second threshold value which is larger than the first threshold value.

6. The combustion control device for an internal combustion engine according to claim 1,
   wherein the actual compression ratio calculation unit is configured to calculate a moving average of the detected cylinder pressure before compression or the detected cylinder pressure before ignition, and to calculate the actual compression ratio using the moving average.

7. The combustion control device for an internal combustion engine according to claim 1, further comprising an air supply pressure sensor for detecting an air supply pressure, wherein the actual compression ratio calculation unit is configured to calculate a cylinder pressure before ignition (Pc=Ps+ΔP) by adding an air supply pressure (Ps) detected by the air supply pressure sensor to a difference between the cylinder pressure before compression and the cylinder pressure before ignition detected by the cylinder internal pressure sensor (ΔP) and to calculate the actual compression ratio using the air supply pressure (Ps) and the calculated cylinder pressure before ignition (Pc).

8. A combustion control method for an internal combustion engine comprising:
   an actual compression ratio calculation step of calculating an actual compression ratio $\epsilon$ from a calculation formula of $\epsilon=(Pc/Ps)^{1/\kappa}$, where $\kappa$ is a specific heat ratio of an operating gas, based on a cylinder pressure before compression (Ps) and a cylinder pressure before ignition (Pc) detected by a cylinder internal pressure sensor;

a deposit deposition amount estimation step of calculating a design compression ratio $\epsilon'$ from a calculation formula of $\epsilon'=Vs'/Vc'$, where $Vs'$ is a design value of a cylinder internal volume before compression and $Vc'$ is a design value of a cylinder internal volume at a same crank angle as a crank angle upon detection of the cylinder pressure before ignition and estimating a deposit deposition amount in a cylinder from a deviation between the calculated actual compression ratio $\epsilon$ and the design compression ratio $\epsilon'$ by comparing the actual compression ratio $\epsilon$ and the design compression ratio $\epsilon'$; and an operation condition correction step of correcting an operation condition of the internal combustion engine when the deviation exceeds a threshold value.

9. The combustion control method for an internal combustion engine according to claim 8, wherein the operation condition includes an ignition timing, and wherein the operation condition is corrected so as to delay the ignition timing when the deviation exceeds the threshold value.

* * * * *